Dec. 7, 1965  E. H. LAND  3,221,599
METHOD FOR PRODUCING AND VIEWING MULTICOLORED
STEREOSCOPIC IMAGES
Filed May 27, 1960  4 Sheets-Sheet 1

INVENTOR.
Edwin H. Land
BY
Brown and Mikulka
ATTORNEYS

Dec. 7, 1965  E. H. LAND  3,221,599
METHOD FOR PRODUCING AND VIEWING MULTICOLORED
STEREOSCOPIC IMAGES
Filed May 27, 1960  4 Sheets-Sheet 3

INVENTOR.
Edwin H. Land
BY
ATTORNEYS

3,221,599
METHOD FOR PRODUCING AND VIEWING MULTICOLORED STEREOSCOPIC IMAGES
Edwin H. Land, Cambridge, Mass., assignor to Polaroid Corporation, Cambridge, Mass., a corporation of Delaware
Filed May 27, 1960, Ser. No. 32,283
2 Claims. (Cl. 88—29)

This invention relates to novel methods and systems for producing and viewing images in color.

The present invention is primarily concerned with the production and viewing of images in which may be observed not only the colors classically associated with color-providing means such as light sources or filter elements employed to produce and/or to view said colors, but also colors usually associated with wavelengths which would be blocked by these very filter elements.

In my copending application Serial No. 809,407 there was described the production of multicolored images through other-than-conventional color-providing elements. More particularly, the said application shows, in conjunction with black-and-white, color-separation transparency records, various combinations of light source means and color filter elements adapted to transmit relatively long and short wavelengths or bands of wavelengths narrowly spaced in the electromagnetic spectrum; the use of combinations of long and short wavelengths located in a given half or in both halves of the spectrum; and the use of one set or combination of wavelengths for producing the color-separation records and a different set or combination for viewing purposes.

The systems described herein provide multicolored images which, in some instances, are generally similar to, and, in other instances, differ in appearance from those produced by the method of the aforesaid copending patent application and which may find a particular application in certain fields where a plurality of images having the characteristics described herein are required as, for example, in the formation of multicolored stereoscopic images.

With the foregoing considerations in mind, objects of the present invention are to provide improved and simplified methods of producing multicolored images which may be employed either for projection viewing or for direct viewing, and which may find usage in such fields as stereoscopy, the graphic arts and in cathode-ray devices such as television.

Other objects of the invention will in part be obvious and will in part appear hereinafter.

The invention accordingly comprises the processes and systems involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
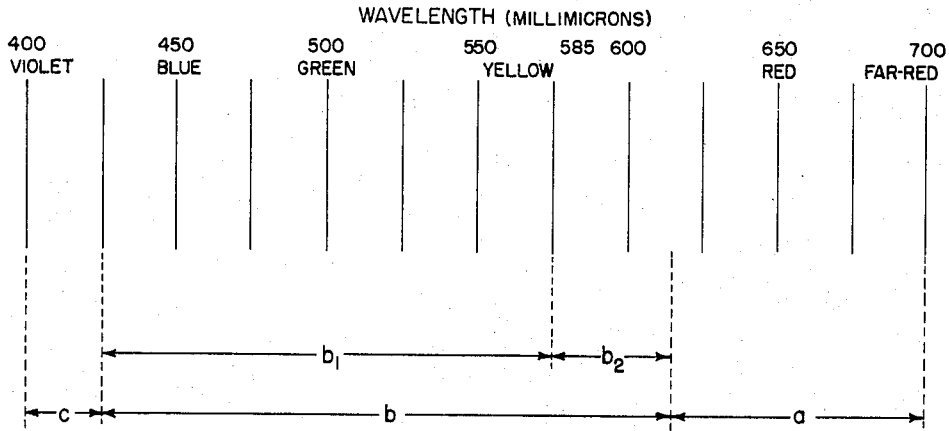
FIGURE 1 is a diagrammatic illustration of various possible combinations of wavelengths which may be used in the production of multicolored images.

The ability to produce, by two-color synthesis, an image of a photographic subject exhibiting to a considerable extent a wide range of the colors of the subject is, of course, well known in the photographic art. The method usually involves the use of a pair of taking filters of a broad-band type, e.g., filters transmitting red and green, respectively, with a pair of generally similar viewing filters, the latter being employed with color-separation black-and-white records of the subject in a projection system. A modification of the method permits the use of but a single viewing filter, e.g., a red filter, with one of the records, the other record being viewed without a filter. Without the color-separation records, the filters merely produce conventional color mixtures. The phenomenon, wherein colors which are not confined to the spectral color or colors of the means employed in producing them are observed in an image, has variously been attributed to such causes as "simultaneous contrast," the "evokement of complementary colors" and "retinal fatigue."

None of the foregoing interpretations seem to present a basis for a more complete understanding of principles from which significant results can be deduced. In contrast thereto, the theory outlined herein, constituting a considerable departure from previously-held concepts, appears to provide such a basis. Its principal point of such departure is, perhaps, a new characterization of the role of wavelengths of light in the production of the gamut of colors visible in the image wherein a certain independence of color with respect to wavelength is shown. The methods and systems presented herein, as exemplifying the present theory, include the use of color-filter means which, otherwise employed, would block certain of the colors observed in the image; various heretofore unknown combinations of wavelengths with proper color-separation records such, for example, as pairs of narrow-band essentially monochromatic wavelengths closely spaced within a given half, only, of the visible spectrum or combinations of more widely separated bands; a novel combination of wavelengths which, as employed herein, provide colors differing from those of conventional color mixture curves or chromaticity diagrams for similar wavelength combination; and various multi-image applications. The wavelength combinations of the present invention, having a primary function of providing a range of colors, are not to be confused with other combinations which may deviate slightly from the conventional red and green for some secondary purpose such as that of toning down one portion of the spectrum or bringing out another portion predominantly.

It can now be shown that the gamut of colors visible at different points in an image is due to various ratios provided between long and short wavelength intensities or brightnesses at these points and not to wavelengths of light issuing from the aforesaid points, taken, per se, as fixed and invariable locations in the spectrum. The present theory assumes that any one of a large number of combinations of light of long and short wavelengths used with a given pair of long and short wavelength color-separation records, or their functional equivalents, produces a gamut of visible colors which is generally similar to that produced by another, and this is precisely what occurs. In other words, wavelength and color are substantially independent of one another except for a proper long-short relationship. In general, in the image-forming systems contemplated, with certain exceptions to be explained below, a long wavelength stimulus is identified with a long wavelength color-separation record and a short wavelength stimulus is identified with a short wavelength color-separation record.

Assuming, for example, that a pair of black-and-white color-separation records or transparencies of the color content of the subject has been made through the medium of red and green taking filters, it is known that they can be projected in two colors to superimposition on a screen or the like, e.g., through red and green filters, or in red and white light, serving as long and short wavelength stimuli, respectively, to provide a multicolored image. In either instance, the varying densities of the color-separation records or images control the transmission of light and thus the relative intensities of the stimuli from point-to-point. It is indicated that a particular individual wavelength employed is of importance, not primarily of itself, but as it contributes to a proper combination of wavelengths or stimuli. As evidenced herein, a large number of combinations of wavelengths are capable of producing a substantially identical sensation of color. The literature has treated the use of a combination of two-color viewing stimuli as involving a somewhat different phenomenon from that in which red and white light are used but this does not seem to be entirely the case. If, as apparently occurs, the eye perceives color by comparing longer and shorter wavelengths or a given wavelength and white light, it must establish a location in the optical spectrum at which the wavelength and white light function similarly. This location or wavelength appears to be approximately 589 millimicrons, namely, the yellow, sodium line. Either white light or this wavelength, or an adjacent wavelength between approximately 560 and 620 millimicrons possesses the characteristic that it can function, alternatively, as the long or as the short wavelength of a pair of color-providing stimuli depending upon whether the other wavelength of the combination is, respectively, a wavelength shorter or longer than the first chosen wavelength. It is at least of passing interest to note that in the vicinity of this region of the spectrum and also in white light, there is a substantial balance of warm and cool colors (or, otherwise considered, an absence of a marked preponderance of either) and that it approximates or is at least adjacent a region to which the human eye is particularly responsive.

FIGURE 1 illustrates diagrammatically various possible combinations of relatively long and short wavelengths which may be employed with proper color-separation records, or their equivalents, as stimuli for producing multicolored images. Any wavelength in the interval $a$ can serve as a long record stimulus; any wavelength in $b$ as a short-record stimulus when used in conjunction with a wavelength in $a$; a wavelength in $b_2$, however, can be used as a long-record stimulus when used in conjunction with a wavelength in $b_1$; wavelengths in $c$ act as long-record stimuli when used with wavelengths in $b$; this is the one case in which the long-record stimulus can be shorter than the short-record stimulus. It is to be understood that the term "wavelength," as used herein, is, in general, to be interpreted as the dominant wavelength of a wavelength band.

Certain combinations of long and short wavelength viewing stimuli which have been found to be highly effective for use with long and short wavelength color-separation records, together with special data relating thereto, are listed in the following table. Preferred taking color-separation means for producing the color-separation records are reddish and greenish filter means, and/or dye sensitizers if the color-separation means is incorporated in a film structure, but they should not be regarded as limited thereto.

*Table 1*

[Values approximate in millimicrons]

| Long-wavelength stimuli: | Short-wavelength stimuli |
|---|---|
| 550–590 | *Up to 580 |
| 550 and above | 400–450 |
| White | Δ up to 580 |
| 590 and above ° | 567 and above |
| 400–430+ | +430–490 |

*At least 10–25 m$\mu$ below wavelength of selected long-wavelength stimulus.
° At least 15 m$\mu$ above wavelength of selected short-wavelength stimulus.
Δ 520–560 m$\mu$ produces magenta instead of red.
+ Reversed positions; separation of at least 20 m$\mu$ required.

Although, as previously described, when proper combinations of long and short wavelength stimuli are used, different brightness ratios controlled by the color-separation records and distributed over various parts of the image produce a gamut of colors, yet, if the total relative intensities of the stimuli are more or less artificially varied as, for example, by varying the relative intensities of projection beams, the colors stay substantially constant. Where the method of the present invention is applicable to the manufacture of a photographic color film, it will be understood that the novel wavelength combinations may be provided through the medium of such structural portions of the film as dye or coupler components, in addition to the dye sensitizers, above mentioned.

Figure 2:
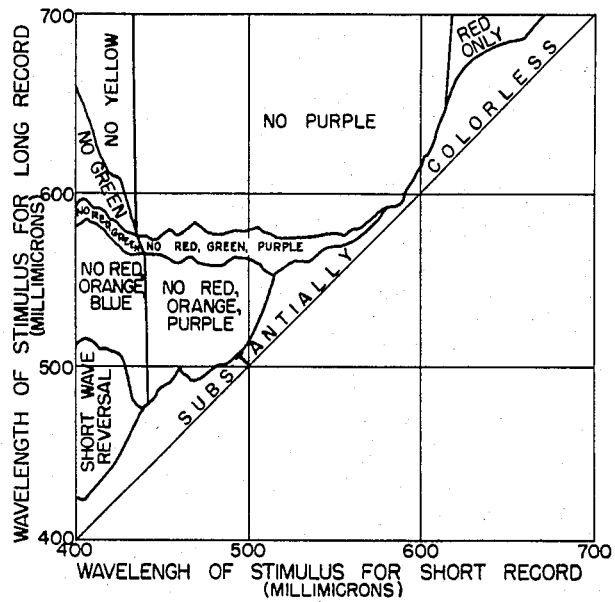
FIG. 2 illustrates, diagrammatically, the limits of color obtainable with various pairs of wavelengths.

A certain minimum separation is necessary between the long wavelength stimulus of a functional combination and the short wavelength stimulus to produce a clearly perceptible range of colors. This minimum is different for different regions of the spectrum. Any wavelengths of a given combination that are spaced far enough apart are, together, capable of producing grays and white, in addition to a gamut of colors extending well beyond that which might conventionally be expected from the stimulating wavelengths. FIG. 2 shows the spacing necessary between various functional pairs of wavelengths and the limits within which a variety of color is visible. The gray area is an achromatic region in which wavelengths are too close together to produce color. In the region designated "short wave reversal," the colors are normal but the short wavelengths are stimuli for the long record and the long wavelengths are stimuli for the short record.

Figure 3:
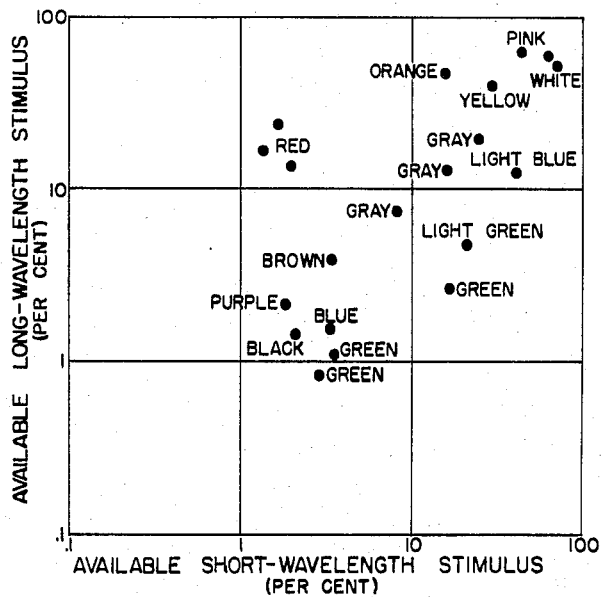
FIG. 3 is a diagrammatic representation of a coordinate system for predicting colors in natural images for a large number of pairs of wavelengths.

In FIG. 3, a coordinate system in the form of a two-dimensional graph that predicts the colors in natural images is illustrated. As previously stated, local variations in the relative brightness of the long and short wavelength stimuli, as controlled by the point-to-point density differences of the color-separation records, give rise to the gamut of colors. The percentages of available long and short wavelengths serving as color-providing stimuli for a theoretical pair of properly illuminated color-separation records have been plotted on the respective axes. The result may be termed a map of points, each associated with a color. The map is divided into two sections by a 45° band, extending from lower left to upper right, in which are the gray and substantially gray points indicative of a similar percentage of available light from both records. Other colors will be noted as arranged in a systematic way about the 45° band, warm colors above and cool colors below. For any selected pair or combination of wavelengths that is capable of producing a gamut of colors when used with a given pair of color-separation record means, the positions of the colors on the coordinate graph remain substantially the same. From the foregoing, it will be apparent that the color of any point in an image of the character described can be predicted in advance by measuring the percentages of transmission in various regions of the pair of color-separation record means employed in forming the image. Where the combination of illuminating wavelengths is capable of stimulating something less than the full gamut of colors, a somewhat different group of coordinate color plots, consistent with the limits shown in FIG. 2, would apply.

It is to be noted that the axes in FIG. 3 do not measure wavelength, brightness or any other physical unit. They express a ratio of intensities at a single wavelength or for a broad band of wavelengths. It is further to be observed that the point-to-point control of brightness throughout the color-separation records is necessarily that exercised by the "natural" images which constitute the records, these images being composed of what may be termed a random or natural distribution of points or areas of relatively different densities determined by what the camera "sees."

A combination of taking color-separation means and viewing stimuli capable of producing a gamut of colors, which is applicable to a color film and which departs considerably from the combinations of Table I, is shown in Table II.

*Table II*

| Long Wavelength Color-separation Means (taking) | Short Wavelength Color-separation Means (taking) |
|---|---|
| Yellow or none with panchromatic emulsion only. | Panchromatic emulsion and greenish filter means. or Orthochromatic emulsion with yellow filter. |
| Long Wavelength Stimulus Means (viewing) | Short Wavelength Stimulus Means (viewing) |
| Red filter means and Image (representing both the long and short wavelength content of the subject). | Minus red or green filter means and Image (representing the short wavelength content of the subject). |

From Table II, wherein in the left-hand column it is noted that no long wavelength taking filter means is employed, it will be apparent that both the long and short wavelength color content of the photographic subject are recorded in the panchromatic emulsion and will be contained in the positive, substantially neutral-toned image obtained therefrom by reversal in situ, or by a diffusion transfer operation. Thus, in conjunction with the reddish filter means for viewing purposes (direct viewing or projection) both the long and short wavelength content of the subject will be represented by this image. However, only the substantially neutral-toned positive image representative of the shorter wavelength content of the subject is identified with the viewing greenish filter means. It will be understood that the two positive image records are visually fused for viewing purposes, either by superimposition or due to their mutual contiguity in a screen pattern.

Figure 4:
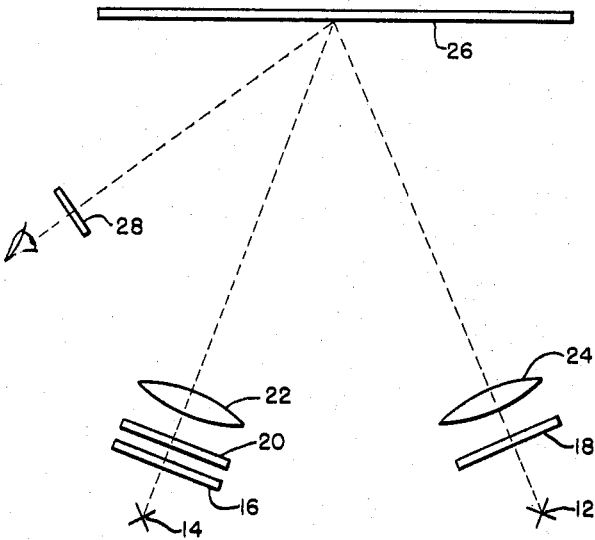
FIG. 4 is a diagrammatic showing of a projection system for providing a multicolored image.

FIG. 4 illustrates, diagrammatically, a projection system for producing a fully colored image comprising sodium light source 12, tungsten light source 14, a pair of black-and-white transparencies consisting of long wavelength color-separation record 16 and short wavelength color-separation record 18, red filter 20 passing, for example, wavelengths longer than approximately 589 m$\mu$, objectives 22 and 24, and screen 26. The tungsten lamp produces white light and the sodium lamp provides light in the yellow region at approximately 589 m$\mu$. The white light from source 14 is converted to red light by filter 20 so that long and short wavelength records 16 and 18 are illuminated by the combination of red and yellow light, respectively, of the aforesaid wavelength characteristics, the projected composite image on screen 26 appearing multicolored, and containing greens and blues, although, as above noted, the shortest wavelength, coming from light source 12, lies in the yellow region of the spectrum. A tungsten source with a yellow filter can be employed in place of sodium light source 12. Alternatively, the records 16 and 18 are reversed as to their locations and a green filter, which, for example, passes wavelengths of 500 to 560 m$\mu$, is substituted for red filter 16, whereupon light source 12, at 589 m$\mu$, becomes the long wavelength source and light source 14 plus the substituted green filter constitutes the short wavelength source. Again the image contains a gamut of colors including red. In the first-mentioned system of FIG. 4, the sodium light, with a wavelength of 589 m$\mu$, serves as the shortest available wavelength and assists in stimulating the green and the blue. In the second-named alternative system, it is the longest wavelength and stimulates red. Assuming both light source 12 and light source 14 plus filter 16 to constitute narrow-band light sources, the red viewing filter 28 is of a sufficiently broad band-pass type to transmit light from source 14 plus red filter 16 and from sodium source 12 but is not adapted, when employed in the usual way as a color filter, to pass greens and blues. However, when the long and short wavelength records are positioned in the paths of light, as here shown, a gamut of colors, including the greens and blues, is visable through the filter. This test is believed to further substantiate a mutual independence of wavelength and color. In the second-named alternative system, a yellow viewing filter which, for example, passes wavelengths of 500 to 590 m$\mu$ would be substituted for red filter 28. When sodium is one of the light sources, filter 16 may be eliminated to produce a substantially similar, but brighter result, thus economizing on the light source.

Figure 5:
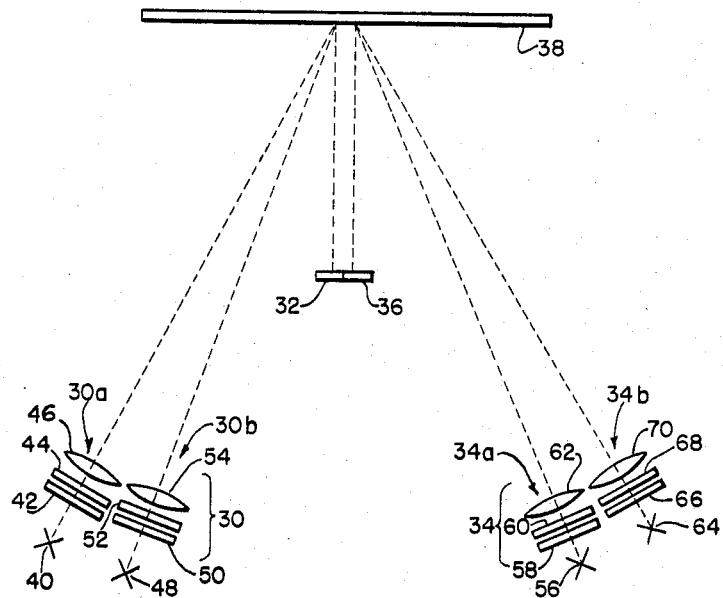
FIG. 5 illustrates, diagrammatically, a system for providing multicolored stereoscopic images.

A stereoscopic system, which may be considered as an extension or doubling of the monocular system of FIG. 4, is illustrated in FIG. 5. The system comprises left-eye projection means 30, left-eye viewing means 32, right-eye projection means 34, right-eye viewing means 36 and screen 38. The left-eye projection means is composed of two projection subassemblies 30a and 30b, which function together to provide an image having a gamut of colors visible to the left eye and also a color characteristic which, in conjunction with the left-eye viewing means 32 and the right-eye viewing means 36, renders it substantially invisible to the right eye of the viewer. The first of these subassemblies includes light source 40, narrow-band filter 42, a first left-eye color-separation record 44 and an objective 46. The second subassembly includes light source 48, narrow-band filter 50, a second left-eye color-separation record 52 and an objective 54. The combination of two filters, 42 and 50, should be chosen according to the long and short wavelength combinations of Table I and should be within a band of wavelengths passed exclusively by viewing filter 32.

The right-eye projection means 34 operates for the right eye of the viewer in a manner similar to that, above described, of means 30 for the left eye. Projection means 34 comprises a first subassembly 34a which includes light source 56, narrow-band filter 58, a first right-eye color-separation record 60 and an objective 62. The second subassembly 34b includes light source 64, narrow-band filter 66 which is properly spaced in the optical spectrum from filter 58, a second right-eye color-separation record 68 and an objective 70. The combination of two filters, 58 and 66, should also be chosen according to the long and short wavelength combinations of Table I and should be within a band of wavelengths passed exclusively by viewing filter 36. It will be understood that the location in the optical spectrum of the filter combination 58 and 66 differs from that of the combination 42 and 50.

Each of the projection means 30 or 34, as set forth, is substantially the equivalent of the complete system of FIG. 4. Taking filters for producing the color-separation records may, appropriately, be similar to the above-described projection filters associated therewith or they may have some other transmission values. The viewers 32 and 36 may, for example, be considered as comprising red left-eye and green right-eye lenses of a pair of viewing spectacles for use with a pair of red filters of slightly differing wavelength, 42 and 50, and a pair of green filters of slightly differing wavelength, 58 and 66. Left-eye lens 32 would then transmit a red pair of images providing a gamut of colors from projection means 30 while blocking a green pair of images from projection means 34 in an anaglyphic operation. Right-eye lens 36 would transmit a green pair of images providing a gamut of colors from projection means 34 while blocking a pair of red images from projection means 30.

Figure 6:
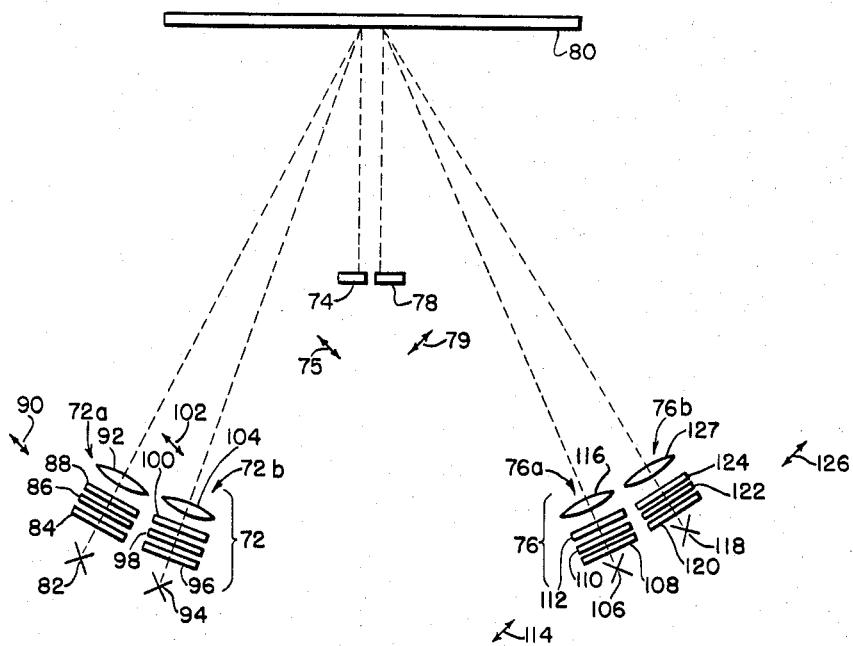
FIG. 6 is a diagrammatic representation illustrating any of several stereoscopic systems which employ combinations of light-polarizing and color filter means for providing multicolored stereoscopic images.

Any of several somewhat similar stereoscopic systems may be explained by the illustration of FIG. 6. A first of these systems comprises left-eye projection means 72, left-eye light-polarizing viewing means 74 having a polarizing direction 75, right-eye projection means 76, right-eye polarizing viewing means 78 having a polarizing direction 79 and non-depolarizing screen 80. The left-eye projection means is composed of two projection subassemblies 72a and 72b which function together to provide an image having a gamut of colors visible to the left eye and a polarizing characteristic which, in conjunction with the left- and right-eye viewing means 74 and 78, renders it visible to the left eye bus substantially invisible to the right eye of the viewer. The first of these subassemblies 72a includes light source 82, red filter 84 providing a long wavelength stimulus, a first left-eye color-separation record 86 of the long wavelength color content of the subject, light-polarizing filter 88 having a polarizing direction 90 indicated by the double-headed arrow, and an objective 92. The second subassembly 72b includes light source 94, blank 96 (which can be omitted), a second left-eye color-separation record 98 of the short wavelength color content of the subject, a light-polarizing filter 100 having a polarizing direction similar to the direction 90, as indicated by the double-headed arrow 102, and an objective 104. The polarizing directions indicated are merely for the purpose of showing the relation of said directions between elements and not actual directions within given elements, as positioned.

The right-eye projection means 76 operates for the right eye of the viewer in a manner similar to that of means 72, above described, for the left eye and, accordingly, the function of each element will not be repeated. Projection means 76 comprises two projection subassemblies 76a and 76b. Subassembly 76a includes light source 106, a long wavelength red filter 108, a long wavelength color-separation record 110, light-polarizing filter 112 having a polarizing direction 114 at substantially 90° to that of the left-eye polarizing filters, and objective 116. Subassembly 76b includes light source 118, blank 120 (which can be omitted), short wavelength color-separation record 122, light-polarizing filter 124 having a polarizing direction 126, and objective 127. The polarizing characteristics of the right-eye projection means, in conjunction with the viewing means 74 and 78, renders the right-eye image, having a gamut of colors, visible to the right eye and substantially invisible to the left eye of the viewer. The foregoing system involves the principles of color vision previously described but provides an extension thereof into the field of stereoscopic image formation.

The light sources may be any sources emitting a broad band of wavelengths providing substantially white light, such as tungsten, xenon, carbon-arc, krypton, or fluorescent. However, in some situations, a source emitting a broad band of wavelengths and used with a narrow band filter may be replaced by a source emitting a narrow band of wavelength, of itself, such as sodium or mercury.

A second stereoscopic system, also exemplified by FIG. 6, merely replaces the blanks 96 and 120 with red or reddish filters of properly shorter wavelength characteristics than filters 84 and 108, respectively, in accordance with Table I.

A third stereoscopic system, again illustrated by FIG 6, replaces blank 96 with a red or reddish filter of properly shorter wavelength than filter 84. Filter element 108 is then replaced by a green filter and blank 120 is replaced by a green or blue-green filter of properly shorter wavelength than the green filter replacing filter 108.

Other possible combinations of light source and filter means in one or both of projection means 72 and 76 to provide alternate pairs of stimuli comprise those elsewhere suggested herein.

Figure 7:
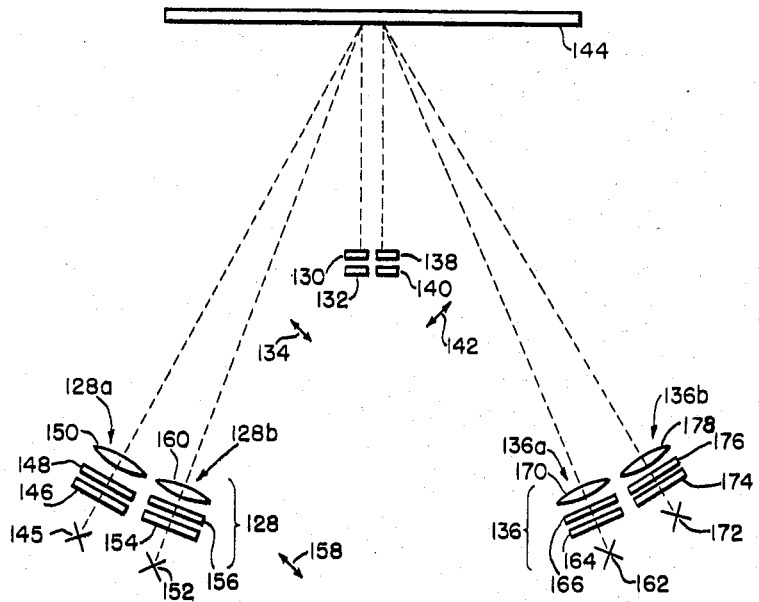
FIG. 7 illustrates, diagrammatically, a modified system employing both light-polarizing and color filter means for producing multicolored stereoscopic images.

A stereoscopic system embodying a somewhat different cooperative use of light-polarizing and anaglyphic means is shown in FIG. 7. The system comprises left-eye projection means 128, left-eye color-filter viewer 130, left-eye, light-polarizing viewing filter 132 having a polarizing direction 134, right-eye projection means 136, right-eye, color-filter viewer 138, right-eye, light-polarizing viewing filter 140 having a polarizing direction 142, and screen 144. The left-eye projection means 128 is composed of two projection subassemblies 128a and 128b which function together to provide an image having a gamut of colors visible to the left eye and having color and polarizing characteristics which, taken with those of the viewing filters 130, 132, 138 and 140, render the image visible to the left eye but substantially invisible to the right eye. The first of these subassemblies 128a includes light source 145, red filter 146 providing a long wavelength stimulus, a first left-eye color-separation record 148 of the long wavelength color content of the subject, and an objective 150. The second subassembly 128b includes a second light source 152, a second left-eye color-separation record 154 of the short wavelength color content of the subject, a light-polarizing filter 156 having a polarizing direction 158 and an objective 160. The red light from subassembly 128a and the white polarized light from subassembly 128b are passed by the left-eye viewing means 130 and 132 but not by the right-eye viewing means 138 and 140.

The right-eye projection means 136 operates for the right eye of the viewer in a manner similar to that of means 128, above described, for the left eye and, therefore, the detailed function of each element will be omitted. Projection means 136 comprises two projection subassemblies 136a and 136b. Subassembly 136a includes a light source 162, a first right-eye color-separation record 164 of the long wavelength color content of the subject, a light-polarizing filter 166 having a polarizing direction 168, and an objective 170. Subassembly 136b includes a light source 172, a green filter 174 providing a short wavelength stimulus with respect to the functionally long wavelength white light stimulus from light source 162, a second right-eye color-separation record 176 of the short wavelength color content of the subject, and an objective 178. The green light from subassembly 136b and the white polarized light from subassembly 136a are passed by the right-eye viewing means 138 and 140 but not by the left-eye viewing means 130 and 132.

The system of FIG. 7, as above described, incorporates means for providing a gamut of colors visible to each eye of the viewer, while at the same time properly maintaining the left- and right-eye stereoscopic images visible only to the left and right eyes, respectively. Wherein color filter elements have been shown in the system of FIG. 7, it will be apparent that pairs of colored filters other than those named may be used provided that they have proper transmission characteristics for wavelengths located in opposite halves of the optical spectrum.

In the several modifications of a stereoscopic system which have been described, it will be evident that some variation of the characteristics of the elements and of their respective locations is possible. Thus, for example, a single light source may be employed for each pair of subassemblies, e.g., 72a and 72b, or for an entire assembly; a beam splitter and single objective may be used for projecting the images of each pair of subassemblies, etc. It will, of course, be apparent that the arrangement shown of color-separation records, filters and polarizing elements in any given path of light is not necessarily critical and that the order of their positions may be changed without materially affecting operation of any of the systems. It is further to be understood that the polarizing axes shown may be altered and that, although plane polarizing means have been shown, circular polarizers may be employed in their stead.

The various combinations, disclosed herein, of color-separation records representative of the color content of a photographic subject with selective pairs of stimulating wavelengths of the character described for producing a gamut of colors are applicable to other than the monocular and stereoscopic projection systems and film structures hereinbefore described. Thus, they may be employed in such widely diverse uses as in photographic bipacks, in the graphic arts wherein, for example, new combinations of printing inks or papers maye be utilized and in television wherein new combination of color information may be stored or transmitted electronically.

In a printing operation, for example, screen elements in any of the long and short wavelength color combinations set forth herein may be printed or otherwise formed on an appropriate surface. Black-and-white long and short wavelength color-separation images are then printed on the surface in correct registration with the screen pattern. To facilitate the printing of images representative of the long-wave content of the subject on a first set of screen elements providing the long wavelength stimulus and the images representative of the short wavelength content of the subject on a second set of screen elements providing the short wavelength stimulus, two types of printing inks for forming the images may be selected, each of which has an affinity for only that set of screen elements with which it is properly to be identified. Or the two sets of screen elements may be formed of materials which are differentially receptive to a given printing ink. An example of a procedure and materials suitable for selectively printing neutral-toned images on separate sets of screen elements, at least one set of which is colored, is the use of a greasy ink and a water-soluble ink for printing images on a screen composed, respectively, of a first set of screen elements which is greasy-ink-respective and water-repellent and a second set of screen elements which is water-receptive and greasy-ink-repellent.

In one example of a television adaptation of the methods and systems disclosed herein, a television tube may, within a single glass envelope, have an electron target comprising an array of two types of cathode-luminescent elements or phosphors. In response to differential electron beams initiated by "color-separation" signals from a transmitter, one element emits light which is functionally similar to the long wavelength stimulus of any of the combinations presented herein and the other element emits light functionally similar to the short wavelength stimuls of the combination, the pair of stimuli providing an image having a gamut of visible colors.

Wherein the color-separation records have been described herein as "black-and-white" or "neutral-toned," it is to be understood that their densities may, alternatively, be rendered in a color medium which, in conjunction with the long- and short-wavelength viewing stimuli, produces a substantially neutral-toned effect in their density areas. Thus, for example, a green color-separation record could be rendered in red and projected in a green beam of light, the color-separation record functioning substantially as though it were rendered in a neutral tone.

The term "viewing," as used herein in connection with filters or other color-providing means, is intended to apply to any part of the method or system other than the "taking" portion. Thus, for example, a viewing filter could be located within a film structure or as an element positioned in a projection beam. Wherein the language a color-separation record "or its equivalent" has been employed, the latter refers to any means that provides color-separation information in conjunction with the color-providing means, it being apparent that electronic means such as a television signal may constitute a substantial equivalent.

Since certain changes may be made in the above process and systems without departing from the scope of the invention herein involved, it is intended that all matter contained in the above description or shown in the accompanying drawings shall be interpreted as illustrative and not in a limiting sense.

What is claimed is:

1. A method of providing in a gamut of colors a composite stereoscopic image of a multicolored photographic subject, comprising the steps of positioning a first pair of black-and-white photographic prints for projection in individual paths of light which converge to substantial superimposition with one another at an image plane, one print of which is produced by photographic taking means recording a relatively long wavelength content of said subject within one-half of the visible spectrum from a first stereoscopic location, and the other print of which is produced by photographic taking means recording a relatively shorter wavelength content of said subject within said one-half of the visible spectrum and also from said first stereoscopic location, positioning a second pair of black-and-white photographic prints for projection in individual paths of light which converge to substantial superimposition with one another and with said first pair at an image plane, one print of which is produced by photographic taking means recording a relatively long wavelength content of said subject within the other half of the visible spectrum from a second stereoscopic location, and the other print of which is produced by photographic taking means recording a relatively shorter wavelength content of said subject within said other half of the visible spectrum and also from said second stereoscopic location, projecting said one print of said first pair in light of a relatively long wavelength within said one-half of the visible spectrum, projecting said other print of said first pair in light of a relatively shorter wavelength within said one-half of the visible spectrum, projecting said one print of said second pair in light of a relatively long wavelength within said other half of the visible spectrum, projecting said other print of said second pair in light of a relatively shorter wavelength within said other half of the visible spectrum, and viewing said prints, projected along said paths as substantially superimposed images, through left- and right-eye viewing filters, the left-eye viewing filter being of a color adapted to pass, substantially exclusively, the light of said relatively long and shorter wavelengths within said one-half of the visible spectrum and the right-eye viewing filter being of a color adapted to pass, substantially exclusively, the light of said relatively long and shorter wavelengths within said other half of the visible spectrum, whereby a multicolored two-dimensional image is rendered visible to each eye individually and a multicolored stereoscopic image is rendered visible to both eyes.

2. A method, as defined in claim 1, wherein said prints of said first pair are projected in red light of relatively long and short wavelengths and said prints of said second pair are projected in green light of relatively long and short wavelengths.

References Cited by the Examiner

UNITED STATES PATENTS

| | | | |
|---|---|---|---|
| 432,530 | 7/1890 | Ives | 96—24 |
| 1,088,412 | 2/1914 | Glover | 88—29 |
| 1,657,270 | 1/1928 | Muller et al. | |
| 1,931,920 | 10/1933 | Bernardi. | |
| 2,133,121 | 10/1938 | Sterns | 88—29 |
| 2,279,281 | 4/1942 | Schensted | 88—16.4 |

OTHER REFERENCES

Land: "Experiments in Color Vision" article in "Scientific American," May 1959, pages 84–99 cited.

DAVID H. RUBIN, *Primary Examiner.*

EMIL G. ANDERSON, JEWELL H. PEDERSEN, *Examiners.*